C. CRAMER.
PROCESS FOR THE MANUFACTURE OF CAUSTIC SODA.
APPLICATION FILED MAY 24, 1920.

1,392,814.

Patented Oct. 4, 1921.

Inventor:
Carl Cramer
By Lawrence Langner
Attorney.

UNITED STATES PATENT OFFICE.

CARL CRAMER, OF ZURZACH, SWITZERLAND, ASSIGNOR TO SCHWEIZERISCHE SODAFABRIK, OF ZURZACH, SWITZERLAND, A CORPORATION OF SWITZERLAND.

PROCESS FOR THE MANUFACTURE OF CAUSTIC SODA.

1,392,814.  Specification of Letters Patent.  Patented Oct. 4, 1921.

Application filed May 24, 1920. Serial No. 383,902.

*To all whom it may concern:*

Be it known that I, CARL CRAMER, a citizen of the Swiss Republic, and resident of Zurzach, Canton of Argovia, Switzerland, have invented a new and useful Process for the Manufacture of Caustic Soda, of which the following is a full, clear, and exact specification.

This invention relates to a process for the manufacture of caustic soda (soda lye).

As is well known the causticization of soda by means of lime has hitherto given practically useful results only when carried out at boiling temperature, that is to say, under the continued introduction of steam. The causticization itself occurs as a rule in the course of two or three hours.

Now, it has been found that by emulsifying a soda solution with lime milk by means of a turbomixer having at least one turbine wheel (centrifugally acting blade-wheel) the causticization can be effected in a considerably less period of time, for example, in about 15 minutes, in the cold, without the employment of steam. At the same time higher concentrations of lye can be obtained as no steam is employed (suppression of steam condensates). See *Sulfuric Acid and Alkali*, by Lunge, Vol. II, Part II, 1909, page 803, line 16.

When the process is carried out, the lime milk is dispersed throughout the soda solution by the centrifugal action of the turbomixer. Thereby is obtained a suspension of a high degree of dispersion affording a considerable surface action and the crust of calcium carbonate which forms upon the surface of the particles of the lime milk during the above treatment is continuously broken up by the friction of the said particles on one another.

For example, 2000 kilograms of soda (sodium carbonate) are dissolved in 20 cubic meters of water in a stirring device. 1200 kilograms of lime are then slaked therein. The milk so obtained is circulated by means of pumps through a turbomixer comprising at least one turbine wheel for a period of 15 minutes and is thereby emulsified. The reaction mixture leaves the apparatus in the form of an already causticized lye. This contains 85 grams of caustic soda per liter and has a gravity of 13° Bé.

In the accompanying drawing—

Figure 1:
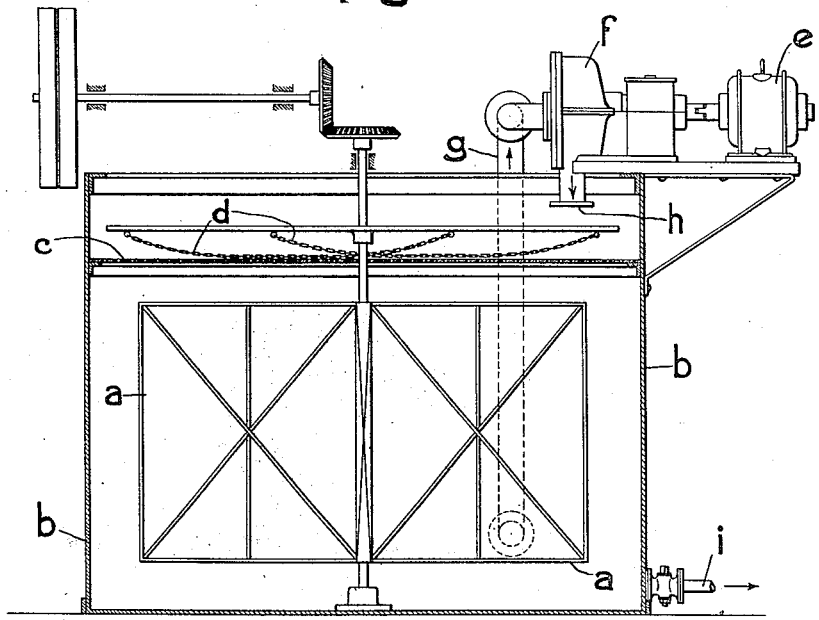
Figure 2:
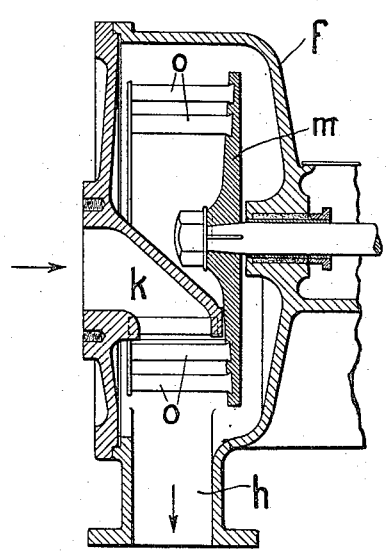
Figure 3:
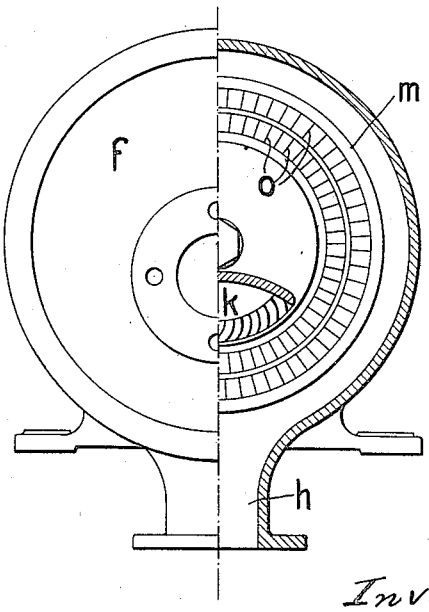

Figure 1 is an elevation partly in section of one form of apparatus suitable for carrying out the process, and Figs. 2 and 3 illustrate a turbo-mixer thereof in vertical section and sectional side view respectively.

The soda to be causticized is dissolved in the tank $b$ which is provided with a stirring mechanism $a$. The lime is slaked on the sieve bottom $c$. The slaking process is suitably accelerated by means of chains $d$ fitted to the arms of the stirring device, while the unburnt limestone remains upon the sieve bottom. The turbo-mixer $f$ which is directly coupled to the electro-motor $e$ is now put into operation. As a result of the suction action of the turbo-mixer the liquid to be causticized passes through the suction pipe $g$ into the turbo-mixer, is there intimately emusified and then returns through the outlet pipes $h$ to the stirring tank $b$. After the causticizing process is completed the causticized lye is discharged through the discharge nozzle $i$.

It will be seen from the construction illustrated in Figs. 2 and 3 that the liquid to be causticized, which enters the turbo-mixer, is passed through the segment $k$ on to a dash-wheel $m$, provided with a large number of beaters $o$, displaced relatively to one another, whereby the functioning of the turbo-mixer effects the emulsification.

The spontaneous decomposition obtained by working with the aid of a turbomixer having at least one turbine wheel may be explained as follows:

As shown by the chemical equation

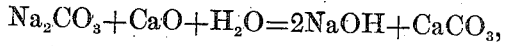

$$Na_2CO_3 + CaO + H_2O = 2NaOH + CaCO_3,$$

there results from each molecule of CaO one molecule of insoluble $CaCO_3$. The particles of CaO suspended in the finest form in the milk of lime give $Ca(OH)_2$ which takes part in the reaction immediately after they have been brought together with the solution of sodium carbonate, forming a determined quantity of NaOH, while they are themselves covered with a thin crust of insoluble $CaCO_3$.

The particles of CaO still capable of reacting but thus inclosed in insoluble $CaCO_3$ are immediately protected against further attack and can consequently not participate in a further reaction. In this state the chemical decomposition is still incomplete and at most performed to 60–65 per cent. In order to continue further the chemical reaction, the protecting crust of $CaCO_3$, which lies around each still active particle of CaO, must be removed, a result which is obtained in a few minutes owing to the intense centrifugal action of the turbomixer, while heretofore this result was attained by working at boiling temperature, employing vigorous stirrers and insufflating simultaneously steam. By the said action of the turbomixer the individual particles of CaO, suspended in the liquid are set into energetic vibrations, whereby they rub one another. In this manner the protecting crust $CaCO_3$ is removed and the CaO still capable of reacting is laid bare and immediately takes part in the further decomposition. This process is repeated until maximal decomposition is attained. What heretofore was obtained by caloric work is now obtained, according to the invention, exclusively by mechanical work. The temperature of the lime slaking does not play any part in the reaction. By slaking the lime in the cold solution of sodium carbonate the temperature of the liquid rises merely a few degrees.

What I claim is:

A process for the production of caustic soda (soda lye) consisting in emulsifying a soda solution with lime milk in the cold in a turbomixer comprising at least one turbine wheel, substantially as described.

In witness whereof I have hereunto signed my name this 10th day of May, 1920, in the presence of two subscribing witnesses.

CARL CRAMER.

Witnesses:
 WILLIAM E. HOLLAND,
 AMAND RITTER.